United States Patent [19]

Bulmahn et al.

[11] Patent Number: 4,864,488

[45] Date of Patent: Sep. 5, 1989

[54] SINGLE LEVEL D.C. OUTPUT VOLTAGE POWER SUPPLY

[75] Inventors: David J. Bulmahn, Winter Springs; David A. Schaffner, Sanford, both of Fla.

[73] Assignee: NCR Corporation, Dayton, Ohio

[21] Appl. No.: 211,950

[22] Filed: Jun. 27, 1988

[51] Int. Cl.[4] .................................................. H02M 7/04
[52] U.S. Cl. ....................................... 363/143; 363/61; 363/84
[58] Field of Search ................... 363/61, 84, 126, 142, 363/143

[56] References Cited

U.S. PATENT DOCUMENTS

| 3,713,018 | 6/1971 | Tscheuschner | 363/143 |
|---|---|---|---|
| 3,720,868 | 3/1973 | Lee | 363/143 |
| 3,851,182 | 11/1974 | Wallace | 363/143 |
| 3,900,787 | 8/1975 | Köster | 363/143 |
| 4,128,867 | 12/1978 | Heyman | 363/143 |
| 4,268,899 | 5/1981 | Rokas | 363/61 |
| 4,291,366 | 9/1981 | Nelson | 363/143 |
| 4,570,211 | 2/1986 | Manda et al. | 363/142 |
| 4,590,546 | 5/1986 | Maile | 363/143 |
| 4,608,498 | 8/1986 | Falzarano et al. | 363/143 |
| 4,608,500 | 8/1986 | Togawa | 363/143 |
| 4,626,981 | 12/1986 | Su et al. | 363/126 |
| 4,633,159 | 12/1986 | Sakaue et al. | 363/142 |
| 4,654,538 | 3/1987 | Lethellier | 363/143 |
| 4,658,345 | 4/1987 | Ingman | 363/126 |
| 4,665,323 | 5/1987 | Russell et al. | 363/143 |
| 4,675,801 | 6/1987 | Terada | 363/143 |
| 4,780,805 | 10/1988 | Chewuk et al. | 363/142 |
| 4,783,729 | 11/1988 | Konopka | 363/143 |

OTHER PUBLICATIONS

"Unitrode Switching Regulated Power Supply Design Seminar Manual", by Raoji Patel, 1982, pp. 4-0—4-4.

Primary Examiner—Patrick R. Salce
Assistant Examiner—Jeffrey Sterrett
Attorney, Agent, or Firm—Wilbert Hawk, Jr.; Stephen F. Jewett; Douglas S. Foote

[57] ABSTRACT

A power supply for producing a single level D.C. output voltage in response to a 110 or 220 A.C. input voltage is disclosed. The power supply automatically selects a full wave diode bridge or voltage doubler configuration and provides series capacitors to filter the D.C. output voltage. The selection is controlled by a switch which responds to the charge on one of the output capacitors. Latching means are also provided to prevent the power supply from switching to the voltage doubler configuration once 220 volts is applied.

13 Claims, 1 Drawing Sheet

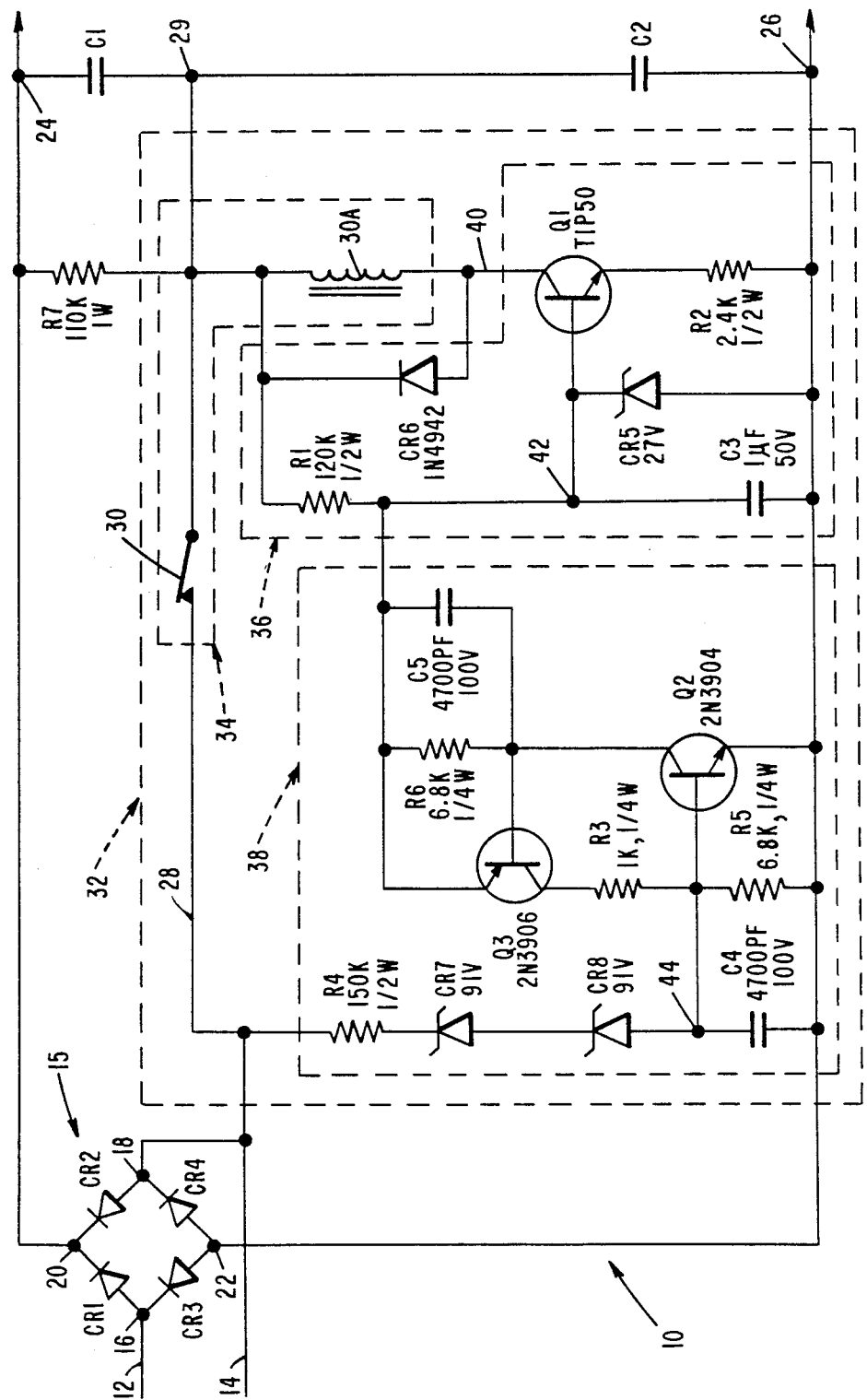

SINGLE LEVEL D.C. OUTPUT VOLTAGE POWER SUPPLY

This invention relates to A.C.-D.C. power supplies and, more particularly, to supplies for providing a single level D.C. output voltage in response to a low or high level A.C. input voltage.

BACKGROUND OF THE INVENTION

This invention is related to co-pending application Ser. No. 151,033, filed on Feb. 1, 1988 now U.S. Pat. No. 4,730,805.

Power supplies for use with electronic equipment, such as computers, are frequently designed for use with either 110 volts or 220 volts A.C. The output of such supplies is generally a D.C. voltage which must be maintained at a substantially constant value regardless of the A.C. input voltage.

In order to satisfy this requirement, some means is normally provided to sense the level of the A.C. input and then modify the power supply circuitry to provide a single level D.C. output. A commonly used technique is to switch the circuit configuration from a full wave rectifier to a voltage doubler. The switching is achieved either manually or automatically.

Many of the prior art systems operate with the possibility that the circuitry will not be in the correct mode when the A.C. voltage is applied. Whether this is due to an incorrect manual setting or an incorrect automatic setting created by an interruption, default or spike in the A.C. input voltage, such incorrect settings can be harmful to the electronic equipment. This is particularly true when the A.C. input voltage is high but is erroneously detected as being low because the D.C. output voltage can exceed a safe level. The reverse problem, i.e., erroneously detecting low A.C. input voltages as being high, can produce too low a D.C. output, also creating problems which effect equipment performance.

OBJECTS OF THE INVENTION

It is an object of the present invention to provide a new and improved power supply for automatically producing a single level D.C. output voltage in response to a low or high level A.C. input voltage.

It is another object of the present invention to provide a power supply that will automatically respond to a switch from a low to a high level of A.C. input voltage, but will not respond to a switch from a high level to a low level without being reset.

It is a further object of the present invention to provide an A.C.-D.C. power supply with a reduced number of components and power dissipation.

SUMMARY OF THE INVENTION

The present invention is a power supply for producing a single level D.C. output voltage in response to a low or high level A.C. input voltage. The power supply includes rectifier means and filter means with first and second capacitors which operate as a full wave rectifier when the A.C. input voltage level is high. The power supply also includes means for switching the full wave rectifier configuration to a voltage doubler configuration when the A.C. input voltage is low. The power supply has current means which are responsive to the charge on the second capacitor for providing a current signal to the switch means when the A.C. input voltage is low. The power supply also has latching means which are coupled to the switch means and responsive to the level of the A.C. voltage for maintaining the switch means in a position so that the voltage doubler configuration is disconnected from the rectifier means once the A.C. voltage is at a high level.

BRIEF DESCRIPTION OF THE DRAWING

The single FIGURE is a circuit diagram of a power supply in accordance with the present invention.

DESCRIPTION OF THE PREFERRED EMBODIMENT

The single FIGURE shows a power supply 10 according to one form of the present invention. Power supply 10 has first and second supply terminals 12 and 14, respectively, for receiving an A.C. supply voltage. As will be explained more fully hereinafter, the supply voltage may be either 110 volts or 220 volts. However, as will be clear to a person skilled in the art, these are only nominal values. Furthermore, the invention applies in a broader sense to any bilevel A.C. voltage input signal.

Power supply 10 includes rectifier means 15 which is shown as a conventional full wave diode bridge with diodes CR1, CR2, CR3, AND CR4. The diode bridge has a first and second inputs 16 and 18 which are connected to first and second supply terminals 12 and 14, respectively. The diode bridge also has first and second outputs 20 and 22 which are connected to first and second output terminals 24 and 26, respectively. Terminals 24 and 26 provide a D.C. voltage to the electronic equipment (not shown) to be serviced.

Power supply 10 has first and second filter capacitors C1 and C2 connected in series across output terminals 24 and 26 in order to provide a relatively constant D.C. output voltage. Capacitors C1 and C2 are thus connected to rectifier means 15 in a manner which provides a D.C. output voltage substantially equal to the peak A.C. input voltage. Power supply 10 also includes voltage doubler means comprising line 28 which is connected between the second A.C. supply terminal 14 and the common point 29 of first and second capacitors C1 and C2. A relay contact switch 30 is located in series with line 28. When switch 30 is closed each capacitor C1 and C2 will charge to substantially the peak A.C. input voltage thereby doubling the peak A.C. input voltage.

In order that switch 30 is closed when the A.C. input voltage is low or 110 volts and open when the A.C. input voltage is high or 220 volts, power supply means 10 includes a control or auto ranging circuit 32. Circuit 32 includes switch means 34, current means 36 and latching means 38.

Switch means 34 comprises relay contact switch 30 and relay coil 30A and is responsive to a current signal on line 40 for connecting the voltage doubler means to rectifier means 15 and capacitors C1 and C2.

Current means 36 includes a first transistor Q1 and a resistor R2 in series with relay coil 30A. Relay coil 30A is connected between common point 29 of capacitors C1 and C2 and the collector of transistor Q1. Resistor R2 is connected between the emitter of Q1 and second output terminal 26. Transistor Q1 has biasing means which include a resistor R1 in series with a capacitor C3. Resistor R1 is connected to common point 29, and resistor R1 and capacitor C3 are connected in parallel with capacitor C2. The base of transistor Q1 is connected to the common point 42 of resistor R1 and capacitor C3.

Current means 36 also includes current limiting means comprising resistor R2, and a zener diode CR5 which is connected between the base of transistor Q1 and and second output terminal 26 in parallel with capacitor C3. A diode CR6 is connected in parallel with relay coil 30A to provide a path for the relay coil current when transistor Q1 is turned off.

Latching means 38 comprises transistors Q2 and Q3 with the collector of Q2 connected to the base of Q3, the emitter of Q2 connected to second output terminal 26, the emitter of Q3 connected to common point 42, and the collector of Q3 connected to the base of Q2 through resistor R3. Transistor Q2 has biasing means including resistor R4 in series with zener diodes CR7 and CR8 and the parallel RC circuit of R5 and C4. Resistor R4 is connected to second supply line 14. The common point 44 of CR8 and the parallel RC circuit of R5 and C4 is connected to the base of Q2. Resistor R5 and capacitor C4 are also connected to second output terminal 26. A second parallel RC circuit of R6 and C5 is connected between the emitter and base of transistor Q3.

In operation, power supply 10 will have an initial state where C1, C2, AND C3 are discharged and switch 30 is open. If 110 volts A.C. is applied to supply terminals 12 and 14 capacitors C1 and C2 begin to charge through diode bridge 15. Current means 36 responds to the increasing charge on C2 by building a voltage on capacitor C3 which drives transistor Q1 into conduction as a current source. As the current through relay coil 30A increases, switch 30 closes thereby connecting the voltage doubler configuration. The D.C. voltage between output terminals will continue to increase until it reaches a value approximately equal to twice the peak input voltage or approximately 300 volts D.C. ($110 \times \sqrt{2} \times 2$).

Zener diode CR5 and resistor R2 limit the collector current of transistor Q1 so that relay coil 30A is driven by a constant current whenever the voltage appearing across capacitor C2 is greater than the sum of the breakdown voltage of zener diode CR5 and the specified voltage of relay coil 30A. Capacitor C3 provides noise suppression to latch means 38 as well as providing a delay to the turning on of transistor Q1 and the closing of switch 30 until latching means 38 determines whether 220 volts A.C. has been applied to supply lines 12 and 14.

If 220 volts A.C. is applied to supply terminals 12 and 14, capacitors C1 and C2 again begin to charge through diode bridge 15. Switch 30 is initially open. Latching means 38 responds to the A.C. input voltage on second supply line 14 which will have peak swings in excess of the breakdown voltage of zener diodes CR7 and CR8. When the peak voltage at the input terminal 14 exceeds a predetermined value between 200 and 250 volts but approaching 250 volts, diodes CR7 and CR8 respond by conducting. This drives transistor Q2 into conduction which turns on transistor Q3. The latch configuration is such that Q3 holds Q2 on even after the voltage swing or pulse that initially turned Q2 on has passed.

Parallel RC ciruits R5, C4 and R6, C5 suppress short duration noise transients to prevent nuisance tripping of the latch. When the latch is set transistors Q2 and Q3 are held in saturation. The equivalent impedance at common point 42 is much less than the resistance of R1. This prevents capacitor C3 from charging sufficiently to turn transistor Q1 on, thereby keeping switch 30 open. Latching means 38 maintains switch 30 in its open position once the A.C. input voltage is at the high level, 220 volts. Power supply 10 will therefore be locked into the full wave diode bridge configuration and will be unable to change to the voltage doubler configuration until A.C. power is removed from supply terminals 12 and 14, capacitor C2 discharges and latching means 38 is cleared.

The values of certain elements of power supply 10 which are shown in the FIG. are illustrative of component values used in a preferred embodiment of the present invention. However, these values should not be deemed to be limiting to the present invention.

One advantage of this invention is the relatively few components needed. A further advantage is the relatively low power dissipation of the circuit. Low power consumption is achieved because current means 36 consumes power only during low voltage (110 volts A.C.) operation and because current means 36 draws power only from capacitor C2 which is one-half of the output voltage at terminals 24 and 26.

Numerous modifications, variations, and full and partial equivalents can now be undertaken without departing from the invention as limited only by the spirit and scope of the appended claims.

What is desired to be secured by Letters Patent of the United States is the following.

I claim:

1. A power supply for producing a single level D.C output voltage in response to a low or high level A.C. input voltage comprising:

first and second supply terminals for receiving said A.C. supply voltage;

rectifier means connected to said first and second supply terminals for rectifying said A.C. input voltage;

filter means with first and second series connected capacitors connected to said rectifier means for furnishing a D.C. voltage across first and second output terminals;

voltage doubler means for doubling said D.C. voltage when connected to said rectifier means;

switch means responsive to a current signal for connecting said voltage doubler means to said rectifier means;

current means responsive to the charge on said second capacitor for providing said current signal to said switch means when said A.C. voltage input is at said low level; and latching means coupled to said switch means and responsive to the level of said A.C. voltage for maintaining said switch means in a position so that said voltage doubler circuit means is disconnected from said rectifier means once said A.C. input voltage is at said high level.

2. The power supply of claim 1 wherein said rectifier means comprises:

a full wave diode bridge having a pair of inputs, connected to said first and second supply terminals, and a pair of outputs, connected to said first and second output terminals.

3. The power supply of claim 2 wherein said first and second capacitors of said filter means are connected across said first and second output terminals.

4. The power supply of claim 3 wherein said voltage doubler means includes a line connected between said second A.C. supply terminal and the common point of said first and second capacitors, and wherein said switch means includes a contact switch located in series with said line.

5. The power supply of claim 1 wherein said switch means includes a relay coil and wherein said current means comprises:
    a first transistor connected in series with said relay coil; and
    first biasing means responsive to the charge on said second capacitor for driving said first transistor into conduction as a current source.

6. The power supply of claim 5 wherein said current means further comprises:
    current limiting means for limiting the current flow through said first transistor and said relay coil.

7. The power supply of 6 wherein said current limiting means includes a first resistor connected between the emitter of said first transistor and said second output terminal, and a zener diode connected between the base of said first transistor and said second output terminal.

8. The power supply of claim 7 wherein said current means further comprises a diode connected in parallel with said relay coil to provide a path for the relay coil current when said first transistor is turned off.

9. The power supply of claim 5 wherein:
    the collector of said first transistor is connected to said relay coil;
    said first biasing means includes a series first resistor and third capacitor connected in parallel with said second capacitor, said first resistor being connected to the common point of said first and second capacitors; and
    the base of said first transistoris connected to the common point of said first resistor and said third capacitor.

10. The power supply of claim 1 wherein said latching means comprises:
    first and second transistors; and
    first biasing means responsive to said A.C. input voltage for driving said first transistor into conduction when said input voltage exceeds a predetermined value between said low and high level A.C. input voltages;
    wherein the collector of said first transistor is connected to the base of said second transistor, the emitter of said first transistor is connected to said second output terminal, the emitter of said second transistor is connected to said current means, and the collector of said second transistor is connected to the base of said first transistor through a first resistor.

11. The power supply of claim 10 wherein said first biasing means includes:
    zener, diode means connected between the base of said first transistor and said second supply line; and
    a first parallel RC circuit connected between the base of said first transistor and said second output terminal.

12. The power supply of claim 11 wherein said latching means further comprises:
    a second parallel RC circuit connected between the emitter and base of said second transistor.

13. The power supply of claim 12 wherein said switch means includes a relay coil and wherein said current means comprises:
    a first transistor connected by its collector to said relay coil; and
    second biasing means responsive to the charge on said first capacitor for driving said third transistor into conduction as a current source, said second biasing means including a series second resistor and third capacitor connected in parallel with said second capacitor, said second resistor being connected to the common point of said first and second capacitors, wherein the base of said third transistor is connected to the common point of said second resistor and said third capacitor; wherein
    the emitter of said first transistor is connected to the common point of said second resistor and said third capacitor.

* * * * *

UNITED STATES PATENT AND TRADEMARK OFFICE
CERTIFICATE OF CORRECTION

PATENT NO. : 4,864,488

DATED : September 5, 1989

INVENTOR(S) : David J. Bulmahn et al.

It is certified that error appears in the above-identified patent and that said Letters Patent is hereby corrected as shown below:

Column 5, line 16, add the word --Claim-- before 6.

Signed and Sealed this

Second Day of June, 1992

Attest:

DOUGLAS B. COMER

*Attesting Officer*      *Acting Commissioner of Patents and Trademarks*